Patented Mar. 2, 1937

2,072,192

UNITED STATES PATENT OFFICE 2,072,192

PROCESS OF TREATING SOUR MILK PRODUCTS

Herman D. Wendt, West Chester, Pa., assignor to Milk Processes, Inc., of Philadelphia, Pa., a corporation of Pennsylvania No Drawing. Application September 24, 1934, Serial No. 745,366

9 Claims. (Cl. 99—62)

The present invention relates to the treatment of sour milk products and is particularly concerned with the production from such products of milk products of low acidity and of desirably low curd content. It has as its object the production from milk products which are of such high degree of acidity and curd content as to render them unfit for conversion into sweet milk products by ordinary means of sweet milk products which are undistinguishable from products obtained from ordinary sweet milk. Thus, by the practice of the process of the present invention sweet milk products such as cream, whole milk, whipping cream, ice cream, sweet butter or the like may be produced from cream of such high acidity and curd content as to render impossible the production of the products by conventional prior art processes.

In the practice of the invention, a sour milk product, such as sour milk or cream, is first partially neutralized to an acidity of approximately 0.05 by means of a suitable alkali, e. g., soda ash, and the resultant product is thereafter subjected to a series of treatments adapted to effect removal of the major portion of the curd content of the product and of the products of neutralization. The removal of these undesired constituents is attained by centrifugation of the neutralized milk product. In this connection, the neutralized product is first heated to a degree sufficient to render its butter fat fluid, i. e., substantially above 100° F. and subjected to centrifugal force in a centrifugal separator to produce a cream of unusually high butter fat content, such as that described in my prior patent Reissue No. 19,123, this cream preferably comprising between 65 and 85% butter fat.

The super cream so produced while still hot is thereafter preferably mixed with a volume of hot water at least as great as the volume of the cream and again centrifuged while heated to maintain its butter fat fluid to effect removal of further undesired ingredients from the mixture of water and cream so obtained, thereby producing a purified super cream which contains but a small proportion of the serum solids and products of neutralization of the sour milk product subjected to the centrifugal treatment.

The practice of a process of this character under the conditions described above is attended with a certain amount of difficulty in connection with the tendency of the butter fat particles to oil off from the mixture during the performance of the steps of centrifugal separation. While this tendency is quite strong during the initial step of centrifugally separating curds and products of neutralization from the original neutralized sour milk product, it presents unusual difficulties in connection with the second step of centrifugal separation following the addition of hot water, because of the fact that the proportionate content of the diluted product subjected to this second centrifugal separation in solids other than fat is much smaller than that of the originally treated product. These solids have a tendency to stabilize the butter fat content of the cream product and the absence of such solids in the liquid subjected to the second stage of centrifugal separation accordingly tends to cause critical difficulties in the nature of oiling in connection with such separation.

I have discovered that these difficulties may be obviated by the addition of a small proportion of an alkali metal salt of citric acid to the material under treatment for the purpose of stabilizing the emulsion of butter fat in liquid. Thus, by the addition to a partially neutralized sour cream of 30% butter fat content of a quantity of sodium citrate consisting of 0.2 to 0.5 part by weight based upon the weight of cream under treatment, I am enabled to practice the sequence of centrifuging and washing steps described above, and to produce a sweet cream of high butter fat content which may be thereafter enriched in milk solids by the addition of skim milk, evaporated milk, dried milk powder, or the like, and diluted with liquid or otherwise suitably treated to produce the desired sweet milk product. In addition to the sodium citrate added to the neutralized sour milk product prior to the initial step of centrifugal separation a further quantity of this compound may be added subsequent to the initial centrifugation and prior to the second stage of centrifugal treatment, the proportion of stabilizing compound added and the stage at which this compound is added being dictated by the nature of the product under treatment and the tendency of that product to undergo the undesired oiling phenomenon. The addition of a stabilizing compound just prior to the second step of centrifugation will frequently be sufficient to obtain the stabilizing function necessary to the practice of the invention, it being in many cases unnecessary to add such a compound prior to the first step of centrifuging the normal butter fat content cream.

As a modification of the process described above, it is possible to cool the cream obtained as the result of the first stage of centrifugal separation and to blend water with this cooled cream and thereafter heat the liquid so produced prior to the second stage of centrifugal separation for the purpose of effecting further removal of undesired ingredients from the cream product. I prefer, however, to perform the process of the invention by diluting the sour cream with hot water without allowing this super cream to cool prior to such addition as the subsequent dilution with water can be much more easily performed in this manner than in connection with a process in which the super cream is cooled prior to such dilution.

By the use of the term "neutralize" in the subjoined claims, I intend to designate all operations in which the milk product is completely neutralized or in which a desired degree of partial neutralization is effected.

I claim:

1. In the manufacture of creamery products from a liquid milk product containing butter fat in the dispersed phase, the steps comprising subjecting the liquid milk product to a centrifugal separating treatment to effect concentration of the butter fat and production of a cream containing over 65% butter fat in the dispersed phase, diluting the cream so produced with other liquid and finally subjecting the diluted product at a temperature substantially above 100° F. to a second centrifugal separating treatment to effect re-concentration thereof and removal of undesired constituents with removed liquid.

2. In the manufacture of creamery products from a liquid milk product containing butter fat in the dispersed phase, the steps comprising subjecting the liquid milk product to a centrifugal separating treatment to effect concentration of the butter fat and production of a cream containing over 65% butter fat in the dispersed phase, diluting the cream so produced with water and finally subjecting the diluted product at a temperature substantially above 100° F. to a second centrifugal separating treatment to effect re-concentration thereof and removal of undesired constituents with removed liquid.

3. In the manufacture of creamery products from a liquid milk product containing butter fat in the dispersed phase, the steps comprising subjecting the liquid milk product to a centrifugal separating treatment to effect concentration of the butter fat and production of a cream containing over 65% butter fat in the dispersed phase, diluting the cream so produced with hot water and finally subjecting the diluted product at a temperature substantially above 100° F. to a second centrifugal separating treatment to effect re-concentration thereof and removal of undesired constituents with removed liquid.

4. In the manufacture of creamery products from a liquid milk product containing butter fat in the dispersed phase, the steps comprising subjecting the liquid milk product to a centrifugal separating treatment to effect concentration of the butter fat and production of a cream containing over 65% butter fat in the dispersed phase, cooling the high butter fat content cream so produced to a condition of plasticity, diluting the cream so produced with other liquid and finally subjecting the diluted product at a temperature substantially above 100° F. to a second centrifugal separating treatment to effect re-concentration thereof and removal of undesired constituents with removed liquid.

5. In the manufacture of creamery products from a liquid milk product of high acidity containing butter fat in the dispersed phase, the steps comprising neutralizing the liquid milk product and thereafter subjecting said product to a centrifugal separating treatment to effect concentration of the butter fat and production of a cream containing over 65% butter fat in the dispersed phase, diluting the cream so produced with other liquid and finally subjecting the diluted product at a temperature substantially above 100° F. to a second centrifugal separating treatment to effect re-concentration thereof and removal of undesired constituents with removed liquid.

6. A process as defined in claim 1 in which a small quantity of an alkali metal salt of citric acid is added to the liquid milk product prior to the first step of centrifugal separation.

7. A process as defined in claim 1 in which a small quantity of an alkali metal salt of citric acid is added to the creamery product in its intermediate stage of manufacture between the first step of centrifugal separation and the second step of centrifugal separation defined in that claim.

8. A process as defined in claim 1 in which a small quantity of an alkali metal salt of citric acid is added to the liquid milk product prior to the first step of centrifugal separation and a further small quantity of an alkali metal salt of citric acid is added to the creamery product in its intermediate stage of manufacture between the first step of centrifugal separation and the second step of centrifugal separation defined in that claim.

9. A process as defined in claim 1 in which a small quantity of an alkali metal salt of citric acid is added to the liquid milk product prior to the second step of centrifugal separation.

HERMAN D. WENDT.